United States Patent [19]
van der Gaag et al.

[11] 4,061,925
[45] Dec. 6, 1977

[54] METHOD AND APPARATUS FOR MEASURING RADIATION FROM A PLURALITY OF LIGHT SOURCES

[75] Inventors: Leonard C. van der Gaag; Luciano Pacheco, both of San Jose, Calif.

[73] Assignee: Versatile Integrated Modules, Santa Clara, Calif.

[21] Appl. No.: 659,591

[22] Filed: Feb. 20, 1976

[51] Int. Cl.² .................. H01L 9/00; H05B 33/00; G01N 21/58

[52] U.S. Cl. ................. 250/553; 250/214 AG; 250/214 B

[58] Field of Search ............ 250/214 B, 552, 578, 250/553, 214 AG, 214 A; 356/230, 215, 226

[56] References Cited

U.S. PATENT DOCUMENTS

| 3,102,921 | 9/1963 | Peras | 356/215 |
| 3,446,972 | 5/1969 | Bentley et al. | 356/229 |
| 3,514,209 | 5/1970 | McGhee et al. | 356/226 |
| 3,761,185 | 9/1973 | Blackwell | 356/229 |
| 3,790,288 | 2/1974 | Hostetter | 356/226 |
| 3,892,493 | 7/1975 | Pallingen et al. | 356/226 |

Primary Examiner—Harold A. Dixon
Assistant Examiner—David K. Moore

[57] ABSTRACT

An apparatus for testing the optical output of light-emitting devices in the presence of ambient light, with means for compensating for said ambient light, is described. The d.c. and periodic components of the ambient light are measured and stored during a time when the apparatus is not being subjected to radiation from the device under test (DUT). When radiation from the DUT is received, the resulting signal is processed with the stored ambient light intensity data, and an output proportional to the intensity of the radiation from the DUT and compensated for the ambient light is provided.

19 Claims, 3 Drawing Figures

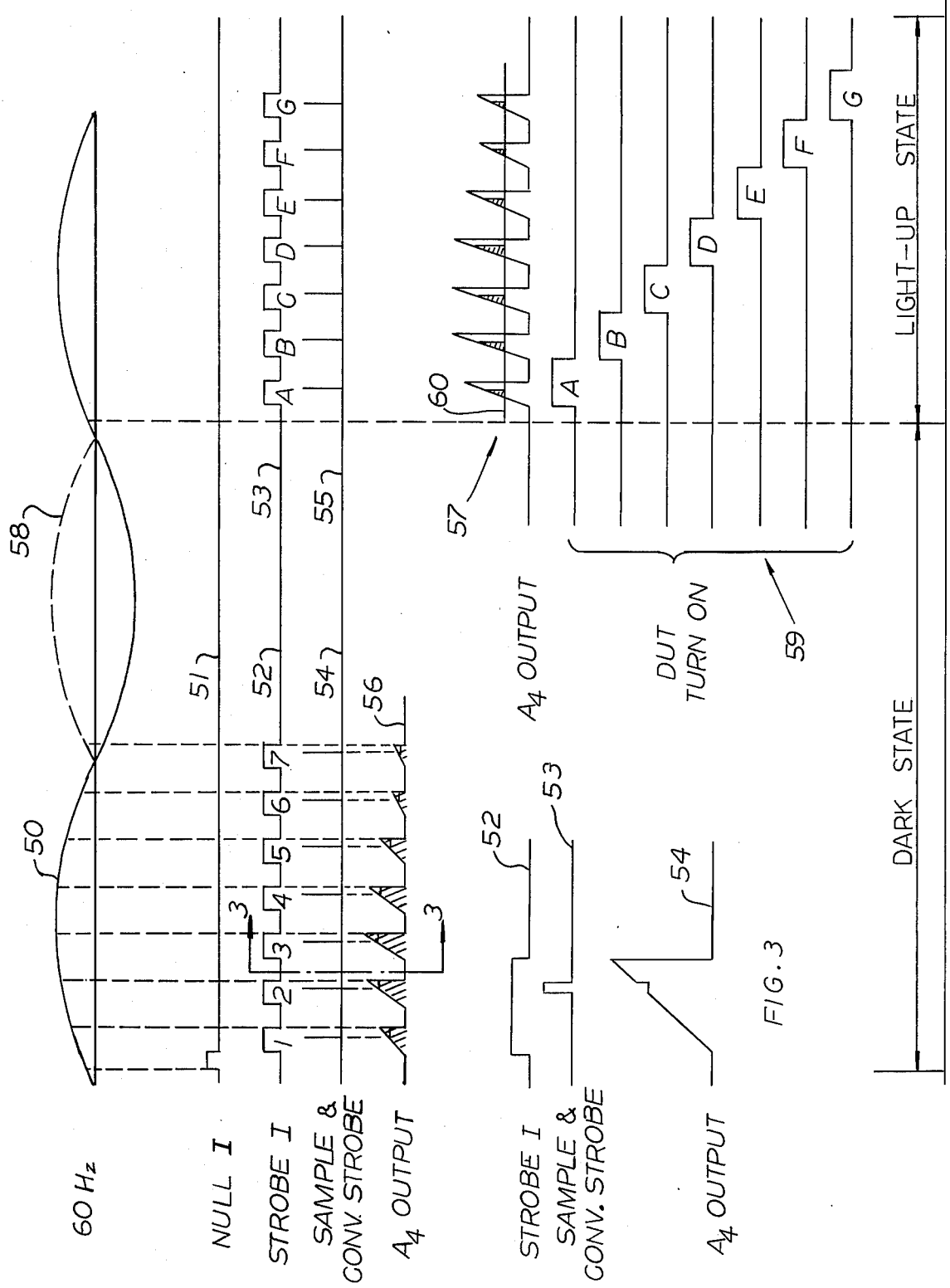

METHOD AND APPARATUS FOR MEASURING RADIATION FROM A PLURALITY OF LIGHT SOURCES

BACKGROUND OF THE INVENTION

The present invention relates to a method and an apparatus for measuring the intensity of radiation from a radiation source and, in particular, to a method and apparatus for measuring the intensity of light from each of the segments of a multi-segmented light-emitting device. A representative example of devices of this type is a light-emitting diode. Diodes of the type described are used, for example, in electronic watches, instrumentation and the like.

In the manufacture of LED's as light-emitting diodes and similar devices are conveniently called, the intensity of the radiation from the devices is measured. If a device is a multi-segmented device with means for providing radiation from each of the segments, then frequently it is desired to test all the segments for a uniform intensity of radiation.

Presently, general area-wide illumination in most testing facilities is by means of incandescent radiation, fluoroscent radiation, or both. To test the intensity of radiation from an LED, it has been necessary to perform the task in a darkroom, in a radiation-shielded area which is shielded from the incandescent and fluorescent radiation, or, if testing is done in the presence of ambient radiation, to compensate for the ambient radiation in some manner.

Both incandescent and fluorescent fixtures are generally operated using 60 Hz power. Using 60 Hz power, there is in the radiation a d.c. component as well as a periodic component having a frequency or repetition rate of 120 Hz.

Considering the radiation from both types of light sources, an incandescent lamp using a filament is considerably less responsive to the cyclical nature of the supply power than is a fluorescent lamp. Because of this, the radiation from an incandescent lamp is frequently considered and treated as d.c. or constant, whereas the radiation from a fluorescent lamp includes a significant 120 Hz component.

Heretofore, the testing of the intensity of radiation from a source of optical radiation in the presence of ambient radiation has been performed in the presence of incandescent radiation by ignoring the small perturbation due to the 60 Hz power. To avoid the necessity of providing for special lighting, it is desirable to be able to test devices in fluorescent, as well as incandescent ambient radiation.

SUMMARY OF THE INVENTION

In view of the foregoing, principal objects of the present invention are a method and an apparatus for measuring the intensity of radiation from a source of radiation in the presence of ambient radiation having a d.c. and a periodic component.

Other objects of the invention are a method and apparatus for measuring the intensity of radiation from each segment of a multi-segmented light-emitting device in the presence of incandescent and flourescent radiation.

Among the features of a preferred method and apparatus in accordance with the above objects for measuring the intensity of radiation from a radiation source, is a circuit including an amplifying means, an integrating means for integrating the output of the amplifying means, a sampling and holding means with a converting means for providing an analog-to-digital signal output corresponding to a sampled output of the integrating means, a source of control signals for providing a first signal corresponding to the intensity of ambient radiation in the absence of radiation from the radiation source, and a second signal corresponding to the intensity of ambient radiation in the presence of radiation from the radiation source, and means for providing an output proportional to the difference between said first and said second signals as a measure of the intensity of radiation from the source.

In the amplifying means there is provided an operational amplifier and a feedback network for nulling at the input of the circuit the signal corresponding to the d.c. component in the ambient radiation. The nulling of the signal corresponding to the d.c. component prevents saturation of the operational amplifier which would otherwise occur due to its normally high-gain characteristics. Most conveniently, the source of control signals is a signal processor for providing control signals synchronized with predetermined phases of the periodic component in the ambient radiation for synchronizing the generation of the first and second signals. The processor contains a storage capacity for storing the first and second signals and means for providing the output corresponding to the difference between the first and second signal.

DESCRIPTION OF THE DRAWING

The above and other objects, features, and advantages of the present invention will be apparent in the following detailed description and accompanying drawing in which:

FIGS. 2 and 3 are diagrams of signals in the apparatus of FIG. 1.

DETAILED DESCRIPTION

Figure 1:
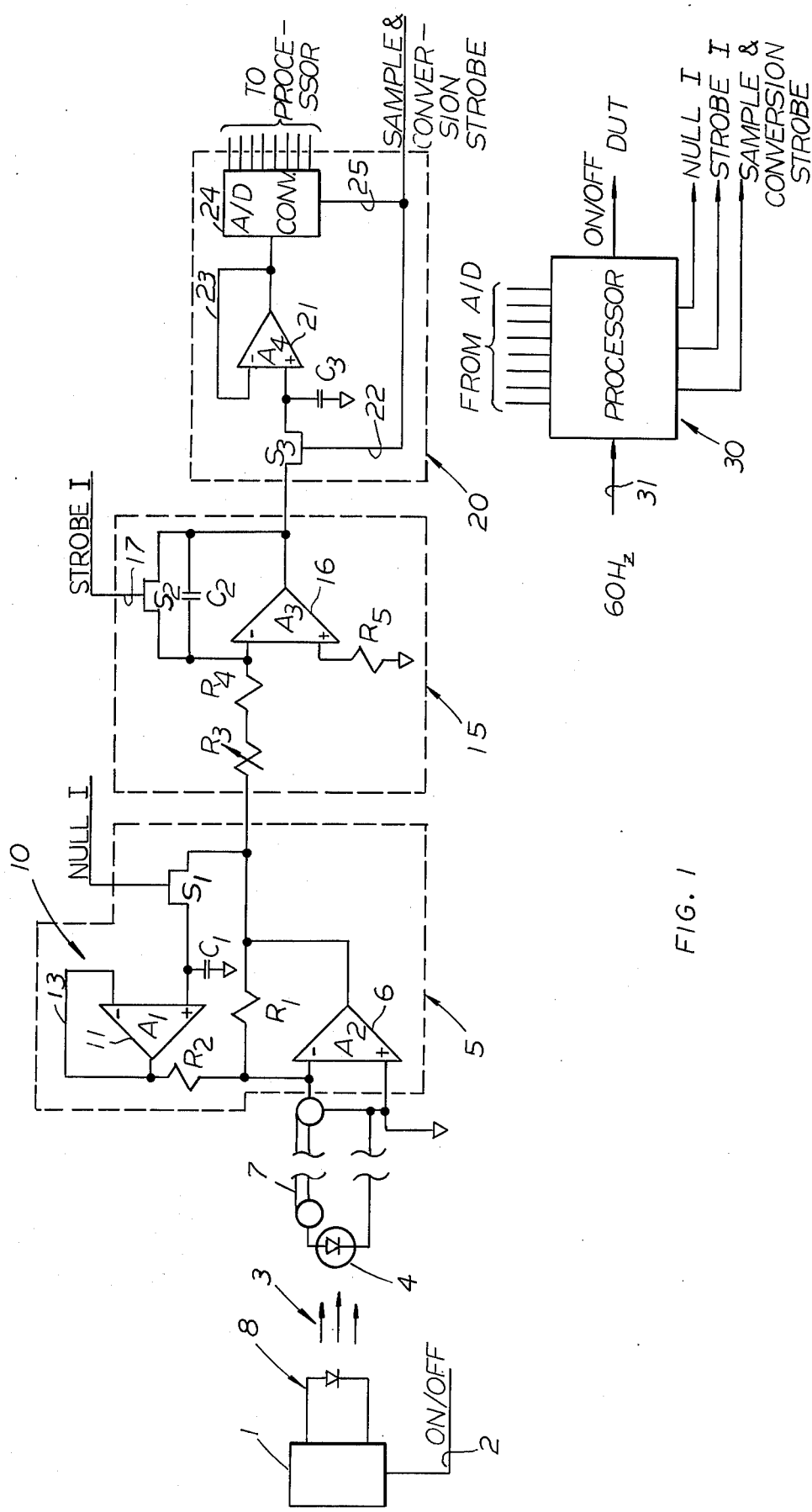
FIG. 1 is a block diagram of a preferred embodiment of the invention.

Referring to FIG. 1, there is provided a power supply 1 having a control signal input 2. The control signal placed on input 2 for controlling the supply 1 is designated ON/OFF. Supply 1 is provided for providing power for a device to be tested, represented here as a diode 8. Diode 8 may have a single source of radiation as shown by the arrows 3, or it may comprise a multi-segmented device comprising a plurality of separate sources of radiation. To the right of device 8 is an input device 4. Device 4, also shown as a diode, is responsive to radiation from the device 8 as well as ambient radiation. The radiation from the device 8 and the ambient radiation may be visible or invisible and, moreover, the ambient radiation may contain a d.c. component, a periodic component or both. When used for testing the intensity of radiation from a light-emitting device, such as a light-emitting diode, the ambient radiation of concern is typically incandescent and/or fluorescent radiation.

For amplifying the output of the input device 4, there is provided an amplifying circuit designated generally as 5. In the circuit 5 there is provided an operational amplifier 6. The device 4 is coupled by means of a coaxial cable 7 to the inverting input (−) of the operational amplifier 6. The non-inverting input of amplifier 6 is coupled to ground. Connected in parallel between the output of amplifier 6 and its inverting input is a feedback resister R1 for controlling the gain of the amplifier 6 and a negative feedback network designated generally as 10. In network 10 there is provided an operational amplifier 11. Coupled between the output of amplifier 6 and the non-inverting input of amplifier 11 is a capacitor C1 and a field effect transistor (FET) S1 having a gate control signal input 12. The signal on input 12 for controlling the FET S1 is designated NULL I. The output of the amplifier 11 is coupled directly to its inverting input by a line 13 and to the inverting input of amplifier 6 by a resistor R2.

To the right of amplifying circuit 5 is an integrating circuit, designated generally as 15. In circuit 15 there is provided an operational amplifier 16. The output of amplifying circuit 5 is coupled to the inverting input of the operational amplifier 16 by a variable resistor R3 and a fixed resistor R4. The non-inverting input of amplifier 16 is coupled to ground by a resistor R5. Coupled in parallel between the output of amplifier 16 and its inverting input as a capacitor C2 and a field effect transistor (FET) S2 having a gate control input 17. The control signal placed on input 17 for controlling the FET S2 is designated STROBE I.

Coupled to the output of the integrating circuit 15 is a sample and hold circuit 20. In circuit 20 there is provided an operational amplifier 21. The output of integrating circuit 15 is coupled to the non-inverting input of the amplifier 21 by a field-effect transistor (FET) S3 having a gate control signal input 22. The control signal placed on input 22 for controlling the FET S3 is designated SAMPLE & CONVERSION STROBE. Coupled to ground between the FET S3 and the noninverting input is a capacitor C3. The inverting input of amplifier 21 is coupled directly to its output by a line 23. For converting the output of the amplifier 21, there is coupled to its output an analog-to-digital converting circuit 24 having a plurality of output lines designated TO PROCESSOR and a control signal input line coupled to input 22 for receiving the SAMPLE & CONVERSION STROBE signal.

The processing of the output from the sample and hold circuit 20 and the generation of the control signal designated ON/OFF, NULL I, STROBE I and SAMPLE & CONVERSION STROBE are provided by a processor 30. Processor 30 is shown separate and apart from the circuit 2, 5, 15 and 20 simply for ease of illustration. Typically processor 30 comprises a conventional pre-programmed micro-processor. To synchronize the operation of the processor and the generation of the control signals with respect to ambient radiation having a periodic component, the processor is provided with an input line 31. Line 31 is provided for receiving a reference signal corresponding to the period of the periodic radiation. For examle, if the ambient radiation is fluorescent radiation from a source coupled to a 60 Hz supply, the reference signal will be 60 Hz. Typically the reference signal is obtained by coupling the processor to the supply.

Referring to FIG. 3, there is shown a plurality of waveforms 50, 51, 52 and 53, 54 and 55, and 56 and 57, which represent, respectively, a 60 Hz reference signal applied to the input 31 of processor 30, the control signal designated NULL I, the control signal designated STROBE I, the control signal designated SAMPLE & CONVERSION STROBE and the output of the amplifier 21 in the sample and hold circuit 20. The 60 Hz reference signal waveform 50 is shown in solid line and corresponds to the frequency of supply power supplying a source of fluorescent radiation. Superimposed on the waveform 50 is a dashed waveform 58. Waveform 58 represents the 120 Hz periodic change in the intensity of fluorescent radiation supplied by a source supplied by 60 Hz power. The NULL I control signal comprises a single pulse which is generated by the processor 30 for coupling the input of the amplifier 11 to the output of amplifier 6 each time it is desired to measure the intensity of the ambient radiation in the absence of radiation from the device 8. The STROBE I control signal comprises a first and a second plurality of pulses, represented by the waveforms 52 and 53, which are generated after the NULL I control signal. The specific number of pulses in each plurality corresponds to the number of segments in the device 8. The SAMPLE & CONVERSION control signal likewise comprises a plurality of pulses corresponding in number to the number of STROBE I pulses generated. The relative timing of the two sets of pulses is such that the sample and hold pulses each occur during the period of an associated one of the STROBE I pulses. While there is only one NULL I pulse generated during each cycle of operation, there are two sets of associated STROBE I and SAMPLE & CONVERSION STROBE pulses which occur at corresponding phases of the reference signal as will be apparent.

Below the waveform 57, is a plurality of waveforms 59 representative of the ON/OFF control signal and the time relative to the generation of the second set of STROBE I and SAMPLE & CONVERSION pulses that each segment of a multi-segmented radiation source is turned on for measuring the intensity of its radiation output.

In describing the operation of the apparatus of the present invention, it is assumed for purposes of the description that the device 8 is a multi-segmented light-emitting device having seven segments, that a cycle of operation comprises in sequence a dark state during which only ambient radiation illuminates the input device 4 and a light state during which the device 8 is turned on and both ambient radiation and radiation from the device 8 illuminates device 4, and that, in a cycle of operation, the intensity of radiation from all of the segments of a device is measured separately.

Thus, in operation in the dark state, the control signal, NULL I, is generated by the processor 30 at a predetermined time relative to the 60 Hz periodic component in the ambient radiation. As shown in FIG. 3, the time may be when the supply power reaches a predetermined positive level. When NULL I is generated, the FET S1 couples the output of amplifier 6 to the input of amplifier 11 and the capacitor C1. During the period of the pulse, the capacitor C1 charges. The charging of C1 causes the amplifier 11 to generate an output which, at the input to amplifier 6, sums with the input from the device 4 and, because of its polarity, reduces the input to the amplifier to zero. This is done to effectively compensate for any d.c. component in the ambient radiation which might otherwise saturate the amplifier 6. Because of the high input impedance of the amplifier 11, the charge on capacitor C1 will remain on C1 substantially undiminished during the remainder of the dark state and the subsequent light state after NULL I is terminated.

After NULL I is terminated, the processor 30 generates seven STROBE I pulses. The number of STROBE I pulses corresponds to the number of the segments of the device 8 to be tested during the light state.

As shown in FIG. 2, the timing of each of the STROBE I pulses is related to a predetermined phase of the reference signal 50. As each STROBE I pulse is generated, the FET S2 allows the capacitor C2 in the integrating circuit coupled to the output of the amplifier 6 to charge. During the period of each of the STROBE I pulses, there is generated by the processor 30, a Sample and Hold pulse. The Sample and Hold pulse controls the FET S3 to couple the amplifier 21 and capacitor C3 to the output of the integrating circuit 15. The period of the Sample and Hold pulse is relatively short so as to provide to the A/D converting means 24 a relatively fixed output from the amplifier 21. A representation of the relative periods of a Sample and Hold pulse and a STROBE I pulse and the "holding" of the output of the amplifier 16 are shown in FIG. 3.

At the completion of the dark state, there is provided at the output of the converter 24 seven digital signals. Each of the digital signals represents the intensity of the periodic component of the ambient radiation after compensation for the d.c. component. The digital signals are stored in a suitable memory or the like in the processor 30.

During the light state, each of the seven segments of the device 8 is turned on one at a time. The turning on of each segment is coordinated by the processor 30 to occur concurrently with the generation of a second set of STROBE I and Sample and Hold pulses. This is accomplished by generating the second set of pulses at the same time relative to the phase of the reference signal 50 as the first set during the dark state. The operation of the apparatus is the same as during the dark state with the exception that, after all segments have been tested, the processor 30 subtracts each of the signal outputs from the converter 24 from the corresponding output obtained during the dark state to obtain an indication of the intensity of the radiation from each of the segments. In FIG. 2 this is shown by a superposition of shaded areas (dark state values) on light state values. If all segments are identical, the output from the processor should be a straight line or a series of pulses of uniform amplitude as illustrated by the straight line 60 superimposed on waveform 57.

While the operation of the apparatus is described for testing a device having seven segments, it is contemplated that a device of any number of segments can be tested even if the periods of the light and dark state extend over several periods of the reference signal. This is possible because the only requirement for operating the apparatus relative to the reference signal is that, when the corresponding STROBE I and Sample and Hold pulses are generated during the dark and light states, they be generated at a time when the intensity of the ambient radiation is the same.

It is intended, therefore, that the description herein be considered only illustrative of the invention, that many changes may be made to the apparatus described without departing from the spirit and scope of the invention and that the scope of the invention be determined by reference to the claims hereinafter provided.

What is claimed is:

1. An apparatus for measuring the intensity of radiation from a source of radiation in the presence of ambient radiation having a periodic component comprising:
   means for generating a first plurality of discrete signals, each of said signals having a magnitude protional to the intensity of said periodic component at a different predetermined time in a cycle of said component in the absence of radiation from said source and a second plurality of corresponding discrete signals, each of said second plurality of signals having a magnitude proportional to the combined intensity of said periodic component and radiation from said source at the same times in a subsequent cycle of said periodic component; and
   means for processing said first and said second signals for indicating the intensity of said radiation from said source.

2. An apparatus according to claim 1 wherein said first and said second signal generating means comprise means for detecting said radiation; means for amplifying the output of said detecting means; and means for integrating the output of said amplifying means.

3. An apparatus according to claim 2 wherein said first and said second signal generating means further comprise means coupled to the output of said integrating means for converting said first and said second signals to first and second digital signals, respectively, and said processing means comprises means for subtracting said first signal from said second signal.

4. An apparatus according to claim 3 wherein said converting means comprises means responsive to a control signal for sampling and holding the output of said integrating means.

5. An apparatus according to claim 4 wherein said radiation is visible.

6. An apparatus according to claim 2 wherein said amplifying means comprises means for preventing saturation of said amplifying means.

7. An apparatus according to claim 6 wherein said saturation preventing means comprises means for reducing the output of said amplifying means by an amount proporational to a d.c. component in said ambient radiation.

8. An apparatus according to claim 7 wherein said reducing means comprises a feedback network coupled to the input of said amplifying means for nulling out a d.c. component in the output of said detecting means.

9. An apparatus according to claim 2 wherein said source of radiation comprises a plurality of sources of radiation and said integrating means comprises means for integrating the output of said amplifying means during a plurality of predetermined periods of said periodic component for generating, during corresponding periods of said periodic component, a first and second signal corresponding, respectively, to the intensity of the ambient radiation in the absence of radiation from said sources and the combined intensity of said ambient radiation and the radiation from each of said sources during a corresponding portion of the period of said periodic component.

10. An apparatus for testing the optical output of a multi-segmented light-emitting device, each of said segments being a source of radiation, in the presence of ambient light having a periodic component comprising:
   means for generating a plurality of first signals in the absence of radiation from said source, each of said first signals being proportional to the intensity of said periodic component at a predetermined time in the cycle of said periodic component;
   means for generating a plurality of second signals, each of said second signals being associated with a particular one of said first signals and proportional to the combined intensity of said periodic component and the radiation from one of said segments during said corresponding predetermined time in the cycle of said periodic component; and means for processing associated first and second signals for providing an indication of the intensity of the radiation from each of said segments.

11. An apparatus according to claim 10 wherein said first and second signal generating means comprises:
means for detecting said radiation;
means for amplifying the output of said detecting means; and
means for integrating the output of said amplifying means during each of said phases of said periodic component.

12. An apparatus according to claim 11 wherein said amplifying means comprises means for nulling out the output of said detecting means caused by a d.c. component in said ambient radiation.

13. An apparatus for measuring the intensity of radiation from a light-emitting device in the presence of ambient radiation having a periodic componet comprising:
means for detecting said radiation;
means for amplifying the output of said detecting means;
means for integrating the output of said amplifying means;
means for sampling and holding the output of said integrating means;
control means for selevtively providing a first plurality of discrete outputs, each of said outputs corresponding to the intensity of said ambient radiation from said light-emitting device at a different predetermined time in a cycle of said periodic component and a second plurality of discrete outputs corresponding to the intensity of said ambient radiation and said radiation from said light-emitting device combined at corresponding times in a subsequent cycle of said periodic component; and
means for providing an output corresponding to the difference between said first and said second outputs, said difference being the intensity of said radiation from said light-emitting device.

14. An apparatus according to claim 13 wherein said light-emitting device has a plurality of light-emitting segments, radiation from said device comprises radiation from each of said segments, and said integrating means comprises means for integrating the output of said amplifying means during a plurality of predetermined time periods, each of said time periods being associated with one of said segments for providing said first and said second outputs with respect to each of said segments.

15. An apparatus according to claim 14 wherein said ambient radiation is periodic ambient radiation and said predetermined time periods comprise predetermined phases of said ambient radiation.

16. An apparatus according to claim 15 wherein said ambient radiation includes a d.c. component and further comprising means for nulling a signal in said apparatus corresponding to said d.c. component.

17. An apparatus according to claim 16 wherein said nulling means comprises a feedback circuit means for nulling said signal corresponding to said d.c. component at the input to said amplifying means.

18. A method of measuring the intensity of light from a light-emitting device in the presence of ambient light having a periodic component comprising the steps of:
measuring the intensity of said periodic ambient light at a plurality of predetermined times in a cycle of said ambient light in the absence of light from said light-emitting device for providing a first plurality of signals;
measuring the intensity of said ambient light and the light from said light-emitting device combined, at corresponding times in a subsequent cycle of said periodic ambient light, for providing a second plurality of signals;
generating an output corresponding to the difference between said first and said second signals for providing an indication of the intensity of the radiation from said device.

19. A method according to claim 18 wherein said light-emitting device is operable for emitting light from each of a plurality of segments and said predetermined phase of said ambient light comprises a predetermined phase associated with each of said segments for providing an indication of the intensity of the light from each of said segments irrespective of a change in the intensity of said ambient radiation between said phases.

* * * * *